F. C. COPPAGE.
Harvester.
No. 56,320.
Patented July 10, 1866.
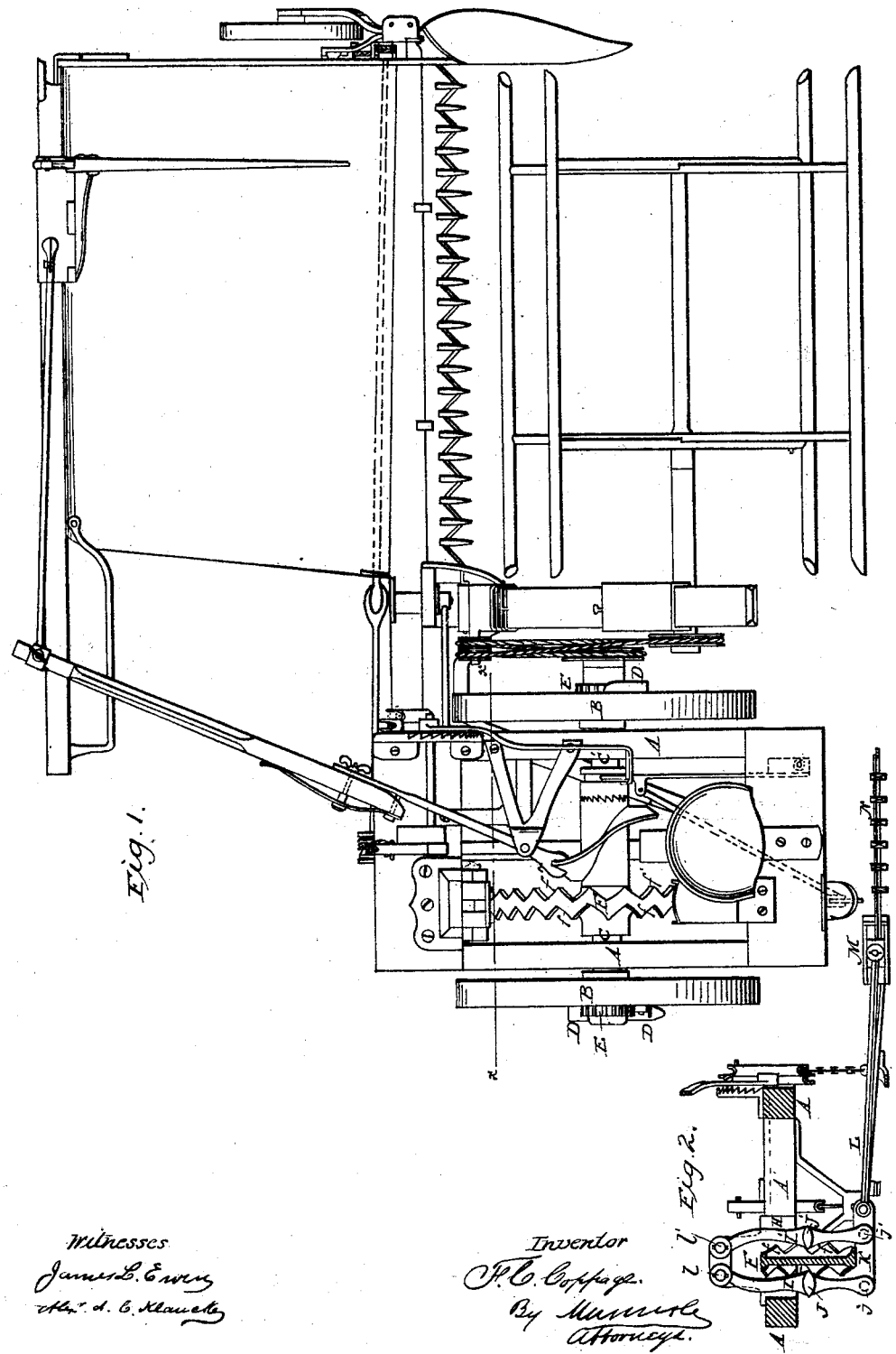

UNITED STATES PATENT OFFICE.

FRANCIS C. COPPAGE, OF TERRE HAUTE, INDIANA, ASSIGNOR TO HIMSELF AND WILLIAM COPPAGE, OF SAME PLACE.

IMPROVEMENT IN HARVESTERS.

Specification forming part of Letters Patent No. 56,320, dated July 10, 1866.

*To all whom it may concern:*

Be it known that I, FRANCIS C. COPPAGE, of Terre Haute, in the county of Vigo and State of Indiana, have made a new and useful Improvement in Harvesters; and I do hereby declare the following to be a full, clear, and exact description of the nature, construction, and operation of the same, sufficient to enable one skilled in the art to which it appertains to construct and use the same, reference being had to the accompanying drawings, which are made part of this specification, and in which—

Figure 1 is a plan or top view of the machine. Fig. 2 is a vertical transverse partial section on the line $x\ x$, Fig. 1.

My improvement consists in the method of operating the sickle-bar.

The pitman of the sickle-bar is pivoted to a frame which vibrates under the impulse of teeth or projections alternately placed on the sides of a wheel, and which projections, by pressure upon pallets, throw the frame alternately to the right and to the left, generating the motion required.

The harvester, of which Fig. 1 is a general view, consists of a main frame, A, mounted on a pair of wheels, B B, on an axle, C, with the usual pawl arrangements D D for so connecting the wheels to the axle as by revolving the latter to actuate the cutting machinery, or by the disconnection of the wheels and axle to permit the former to revolve without the actuation of the apparatus when moving from field to field or to and from the homestead.

The platform and raking apparatus, being made the subject of another and contemporaneous application, need not be particularly described, as the drawings which form a part of this specification will be a sufficient indication of their construction and application relatively to the cutting apparatus, which is the subject-matter of this specification. I shall therefore trace the connection between the prime motors, the driving-wheel, and the sickle-bar, and omit special reference to the accessories by which the grain is caught upon the adjustable platform and raked therefrom, together with the peculiar devices for throwing portions in and out of gear and adjusting them to each other to suit varying circumstances.

The wheels B B being rotated by their traction on the ground under the draft of the team, and the pawls D D being sprung down into the ratchets E, the axle C is rotated, carrying with it the wheel F, whose perimeter is of a convoluted form, caused by the alternate teeth $f\ f'$ on its opposite sides, which project in a direction parallel to the axis of the wheel having inclined sides, the teeth approximating in form to the letter V.

Suspended from a holder, H, on the main frame A is a pivoted and vibrating frame consisting of two members, I I', which are centered on the journals $i\ i'$, and united at their lower ends by a link, K, which is pivoted to them at $j\ j'$, and connected at $l$ to the pitman L, which is attached to the sickle-bar N.

Attached to the suspended pieces I I' are pallets J J' of a lenticular shape. (Seen in elevation, Fig. 2, by sectional and removal of intervening parts.) The pallets are on the same horizontal plane, and while one is passing the summit of one tooth the other occupies the interval between two teeth on the opposite sides of the wheel F, so that by the revolution of the latter the pallets are alternately pushed away from it, and the devices attached to the link K caused to vibrate therewith.

By this arrangement multiplying-gears are dispensed with and the cutter-bar vibrated with sufficient speed and range to enable it to act efficiently by the intervention of a single vibrating frame between it (the cutter-box) and the wheel on the main shaft.

By suspending the drive or zigzag wheel above the ground, as described, all wear from dirt or grit is avoided, which also would interfere with the movement of the pallets in the zigzags, and hence with the movement of the cutter-bar.

By using two independent wheels, as in my invention, the zigzag wheel being on the axle of said wheels, the ratchets and pawls used to throw the wheels in or out of gear can be employed on either or both wheels, and the cutter-bar may be operated by one or both wheels, and nearly equal motion can thus be imparted to the cutters in turning to the right or left, which could not be done if one of the wheels were used as a drive-wheel.

The advantage of the arrangement of employing two levers, I I, over one, when arranged as described, is that the main pivot, about which the levers turn, is directly over the driving-surface of the wheel, and the driving pins or pallets are equally distant from the main pivot, thus keeping them level and not throwing one up and the other down, thereby causing an inequality of motion in the cutter-bar and more friction.

I do not claim, broadly, giving motion to the cutter-bar by means of a zigzag wheel, drive pins or pallets, and levers connected with the cutter-bar; but What I do claim as new, and desire to secure by Letters Patent, is—

The zigzag-wheel F, situated on the axle of the wheels B B, as described, in combination with the frame H, pallets J J, levers I I, link K, pitman L, and cutter-bar N, the whole being constructed, arranged, and operated in the manner and for the purpose set forth.

F. C. COPPAGE.

Witnesses:
  C. D. BELLVILLE,
  F. COPPAGE.